(12) United States Patent
Tseng (10) Patent No.: US 8,085,532 B2
(45) Date of Patent: Dec. 27, 2011

(54) ELECTRONIC DEVICE (75) Inventor: Chen Tseng, Tao Yuan Shien (TW)

(73) Assignee: Quanta Computer Inc., Kuei Shan Hsiang, Tao Yuan Shein (TW)

( * ) Notice: Subject to any disclaimer, the term of this patent is extended or adjusted under 35 U.S.C. 154(b) by 109 days.

(21) Appl. No.: 12/581,239

(22) Filed: Oct. 19, 2009

(65) Prior Publication Data

US 2010/0309614 A1 Dec. 9, 2010

(30) Foreign Application Priority Data

Jun. 9, 2009 (TW) ................................ 98210236 U (51) Int. Cl.
G06F 1/16 (2006.01)
H05K 5/00 (2006.01)
H05K 7/00 (2006.01)
(52) U.S. Cl. ................................................. 361/679.58
(58) Field of Classification Search ........... 361/679.26–679.29, 679.55, 679.58; 312/223.1
See application file for complete search history.

(56) References Cited

U.S. PATENT DOCUMENTS

| 6,256,194 | B1 * | 7/2001 | Choi et al. | 361/679.58 |
|---|---|---|---|---|
| 6,517,129 | B1 * | 2/2003 | Chien et al. | 292/251.5 |
| 6,563,699 | B1 * | 5/2003 | Choi | 361/679.09 |
| 7,097,218 | B2 * | 8/2006 | Lu | 292/304 |
| 7,173,816 | B2 * | 2/2007 | Song | 361/679.06 |
| 7,185,927 | B2 * | 3/2007 | Talukdar et al. | 292/172 |
| 7,261,573 | B2 * | 8/2007 | Lin et al. | 439/135 |
| 7,436,656 | B2 * | 10/2008 | Jiang et al. | 361/679.55 |
| 7,656,663 | B2 * | 2/2010 | Zhao et al. | 361/679.58 |
| 7,743,464 | B2 * | 6/2010 | Tomioka et al. | 16/64 |
| 7,841,632 | B2 * | 11/2010 | Tracy et al. | 292/163 |
| 2005/0152120 | A1 * | 7/2005 | Lee | 361/725 |
| 2005/0276010 | A1 * | 12/2005 | Song | 361/683 |
| 2006/0002062 | A1 * | 1/2006 | Kwon et al. | 361/680 |
| 2006/0221567 | A1 * | 10/2006 | Zhang et al. | 361/683 |
| 2007/0188988 | A1 * | 8/2007 | Zhao et al. | 361/683 |
| 2008/0263819 | A1 * | 10/2008 | Tomioka et al. | 16/71 |

* cited by examiner

Primary Examiner — Jinhee Lee
Assistant Examiner — Adrian S Wilson
(74) Attorney, Agent, or Firm — Thomas|Kayden (57) ABSTRACT An electronic device includes a first, a second body, and an engaging mechanism. The second body is connected to the first body and rotates relatively to the first body. The engaging mechanism, disposed on the second body, includes a rotating member and a moving member. The rotating member is rotatably disposed on the second body. The moving member is movably disposed on the second body and abuts the rotating member. The second body is fastened to the first body by the moving member of the engaging mechanism. When the rotating member rotates along a first direction, the moving member is pushed along a second direction to depart from the first body.

18 Claims, 9 Drawing Sheets

ELECTRONIC DEVICE

This Application claims priority of Taiwan Patent Application No. 098210236 filed on Jun. 9, 2009, the entirety of which is incorporated by reference herein.

BACKGROUND OF THE INVENTION

1. Field of the Invention

The invention relates to an electronic device, and in particular, to an electronic device comprising a convenient engaging mechanism.

2. Description of the Related Art

Figure 1:
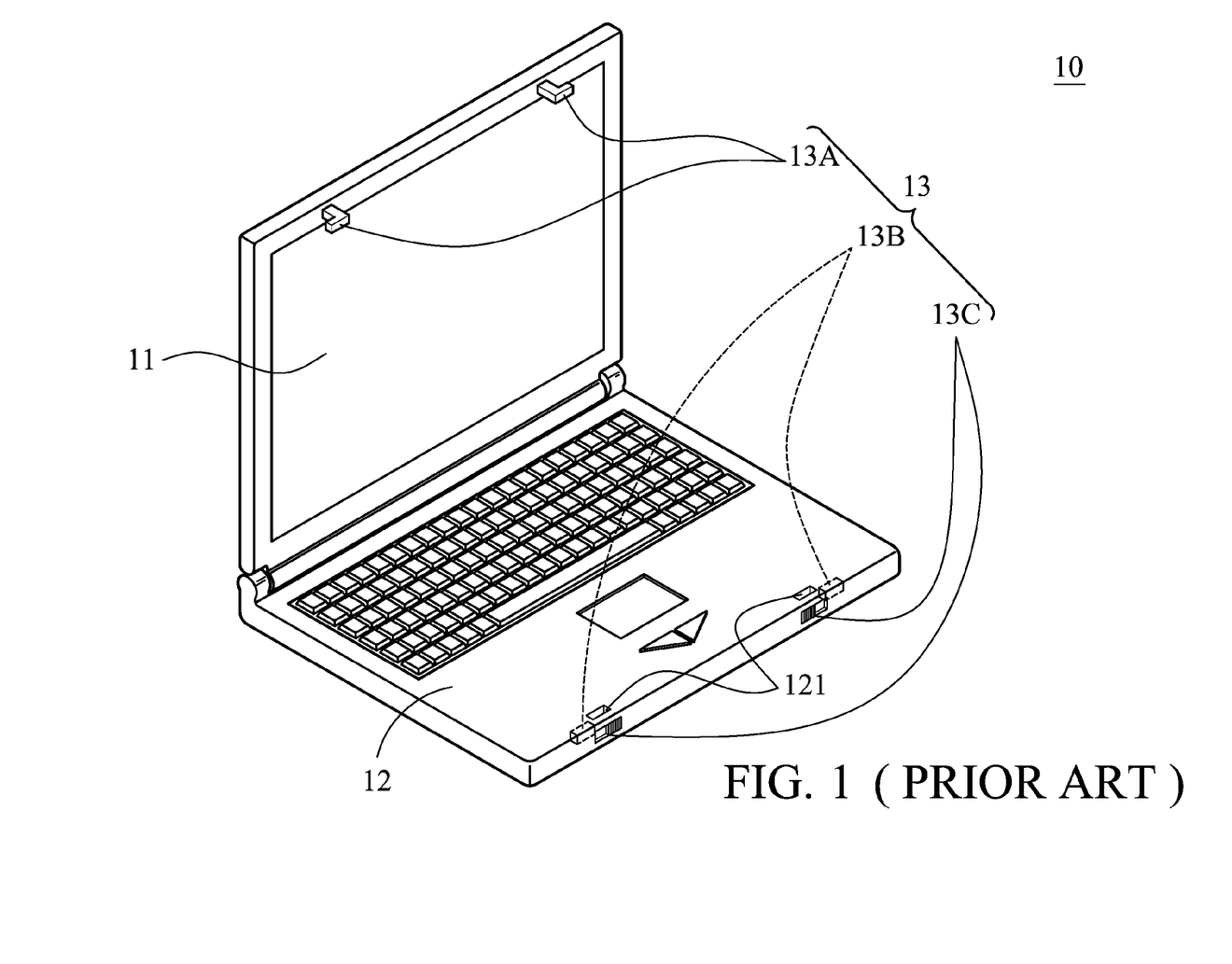
FIG. 1 is a schematic view of a conventional portable computer.

Referring to FIG. 1, for a conventional portable computer 10, an engaging structure 13 is disposed on the peripheries of the display panel 11 and the body 12 to latch the display panel 11 and the body 12 in a closed status.

The engaging structure 13 comprises a pair of engaging members 13A disposed on the periphery of the display panel 11, a pair of corresponding engaging members 13B disposed in the body 12, and a pair of switches 13C, on the front left and front right ends of the portable computer 10, connected to the corresponding engaging members 13B. When the engaging members 13A penetrate through the openings 121 on the body 12 to engage with the corresponding engaging members 13B, the display panel 11 and the body 12 can be maintained in a closed status.

To open the display panel 11 relatively to the body 12, the user has to use both hands to move the switches 13C toward opposite directions, thereby moving the corresponding engaging members 13B so that they are separated from the engaging members 13A. Then, the user lifts up the display panel 11 to open the display panel 11 relatively to the body 12.

Due to the symmetrical disposition of the engaging structure 13 within the portable computer 10, the user has to use both hands to separate the display panel 11 with the body 12 when opening the portable computer 10. Furthermore, two-step (moving the switches 13C and lifting the display panel 11) is required to separate the display panel 11 and the body 12, causing inconvenience of operation.

BRIEF SUMMARY OF THE INVENTION

An electronic device is provided. The electronic device comprises a first, a second body, and an engaging mechanism. The second body is connected to the first body and rotates relatively to the first body. The engaging mechanism, disposed on the second body, comprises a rotating member and a moving member. The rotating member is rotatably disposed on the second body. The moving member is movably disposed on the second body and abuts the rotating member. The second body is fastened to the first body by the moving member of the engaging mechanism and the first body. When the rotating member rotates along a first direction, the moving member is pushed along a second direction to depart from the first body.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2:
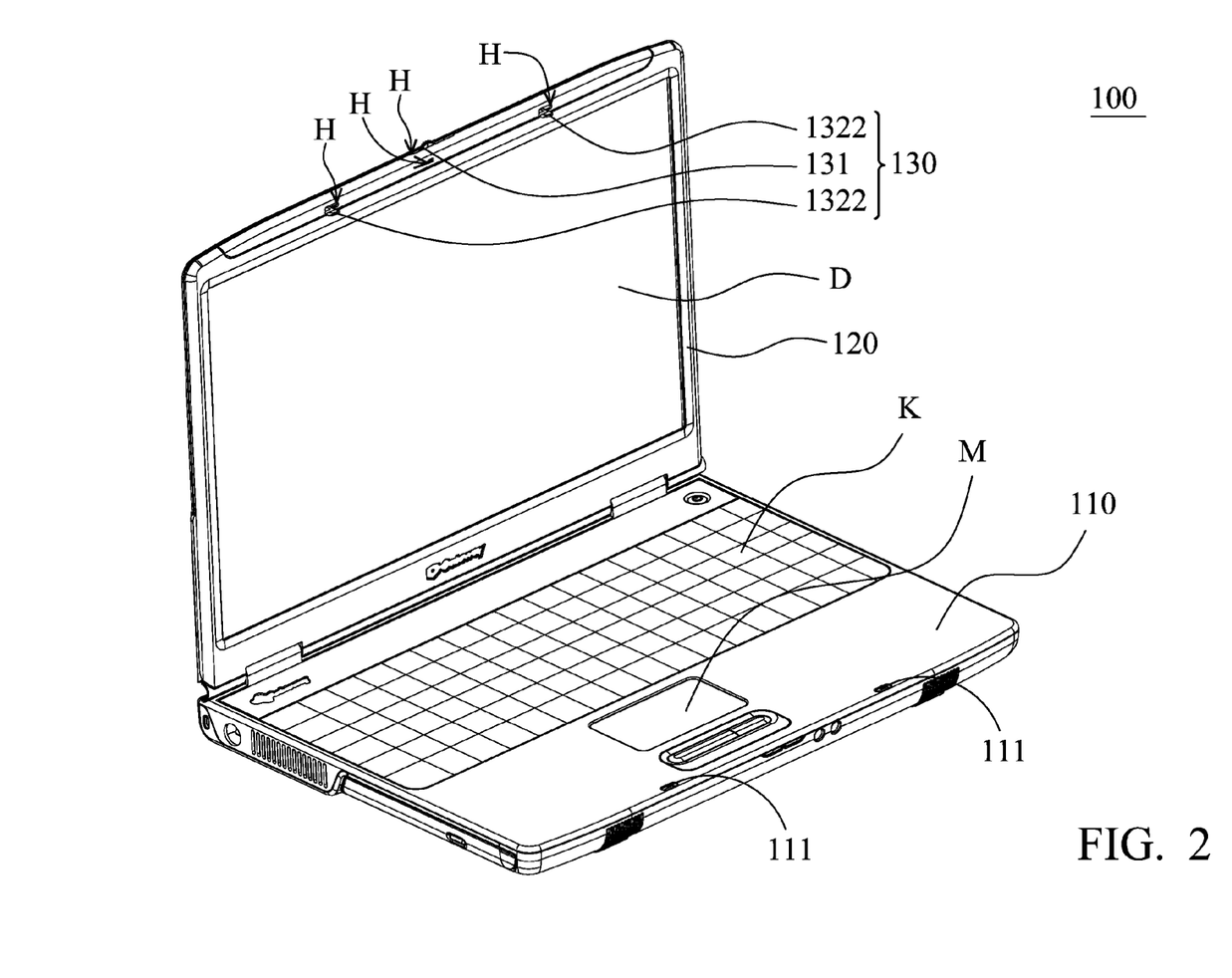
FIG. 2 is a schematic view of an electronic device of the invention.

As shown in FIG. 2A, the electronic device 100 of the invention is a portable computer, comprising a first body 110, a second body 120 and an engaging mechanism 130. The first body 110 is the main body of the portable computer, and an input device K and a pointing device M are included thereon. The second body 120 is the cover of the portable computer, and a display screen D is included thereon. The engaging mechanism 130 is disposed in the second body 120 to let the second body 120 to be fastened to the first body 110. In an embodiment, the input device K is a keyboard, and the pointing device M is a touch pad.

It should be noted that in the embodiment, the engaging mechanism 130 is disposed in the cover of the portable computer and engages with the main body, but it is not limited thereto. The engaging mechanism 130 can also be disposed in the main body of the portable computer and engages with the cover.

Figure 3A:
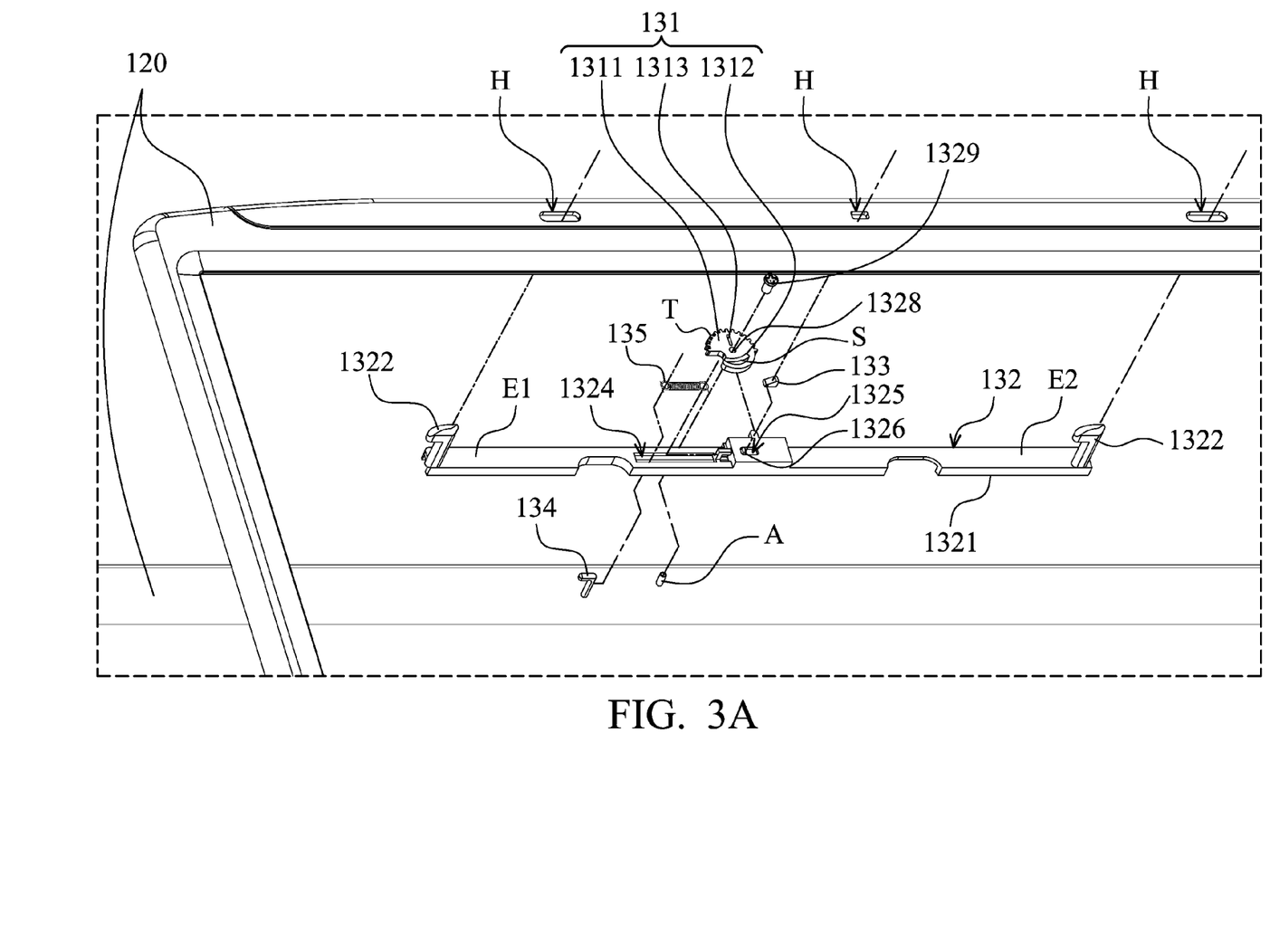
FIG. 3A is an exploded view of an engaging mechanism of the electronic device of the invention.

Referring to FIG. 3A, the engaging mechanism 130, disposed in the second body 120, comprises a rotating member 131, a moving member 132, an abutting member 133, a fixing member 134 and an elastic member 135. Referring to FIG. 2 at the same time with FIG. 3A, the rotating member 131, the hooks 1322 on the moving member 132, and the abutting member 133, all within the second body 120 as the moving member 132, can be exposed outside of the second body 120 via the aperture H on the second body 120 (as shown in FIG. 2). Additionally, the first body 110 has two openings 111 (as shown in FIG. 2) corresponding to the moving member 132 exposed outside of the second body 120, such that the hooks 1322 on the moving member 132 is able to penetrate through the openings 11 and engage with the first body 110.

Figure 3B:
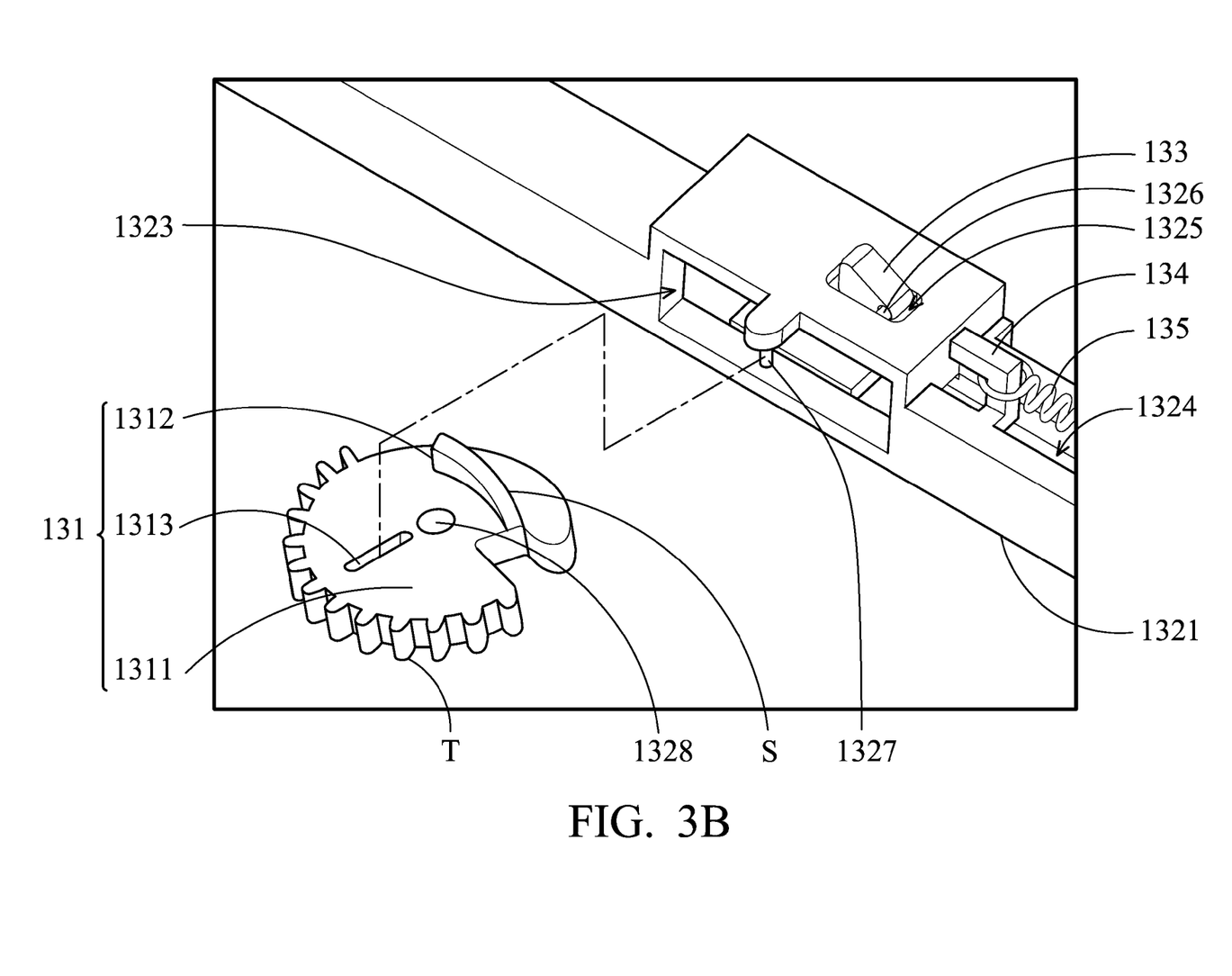
FIG. 3B is an exploded view of a rotating member and part of a moving member of the electronic device of the invention.

Referring to FIGS. 2, 3A and 3B simultaneously, the rotating member 131, which is a short cylinder, is disposed in the second body 120 and comprises a rotating body 1311, a protrusion 1312, a fixing hole 1328 and slot 1313. The rotating body 1311 is rotatably disposed on the second body 120 around an axle A via the fixing hole 1328 and the screwing member 1329. The rotating member 131 also comprises a toothed surface T on its fringe. The toothed surface T of the rotating body 1311 is exposed outside of the second body 120 through the aperture H (as shown in FIG. 2), allowing the user to rotate the rotating member 131 easily. The protrusion 1312 is fixed on the rotating body 1311 and comprises a slanted surface S. The slot 1313 is formed on the rotating body 1311.

It should be noted that in the embodiment the rotating member 131 is a cylinder and comprises the toothed surface T, but it is not limited thereto. The rotating member 131 can also be formed in other shapes, such as a triangular, cylinder, or square shape etc. Additionally, the toothed surface T can also be substituted with a rough surface or grained surface, as long as friction is provided.

Figure 4A:
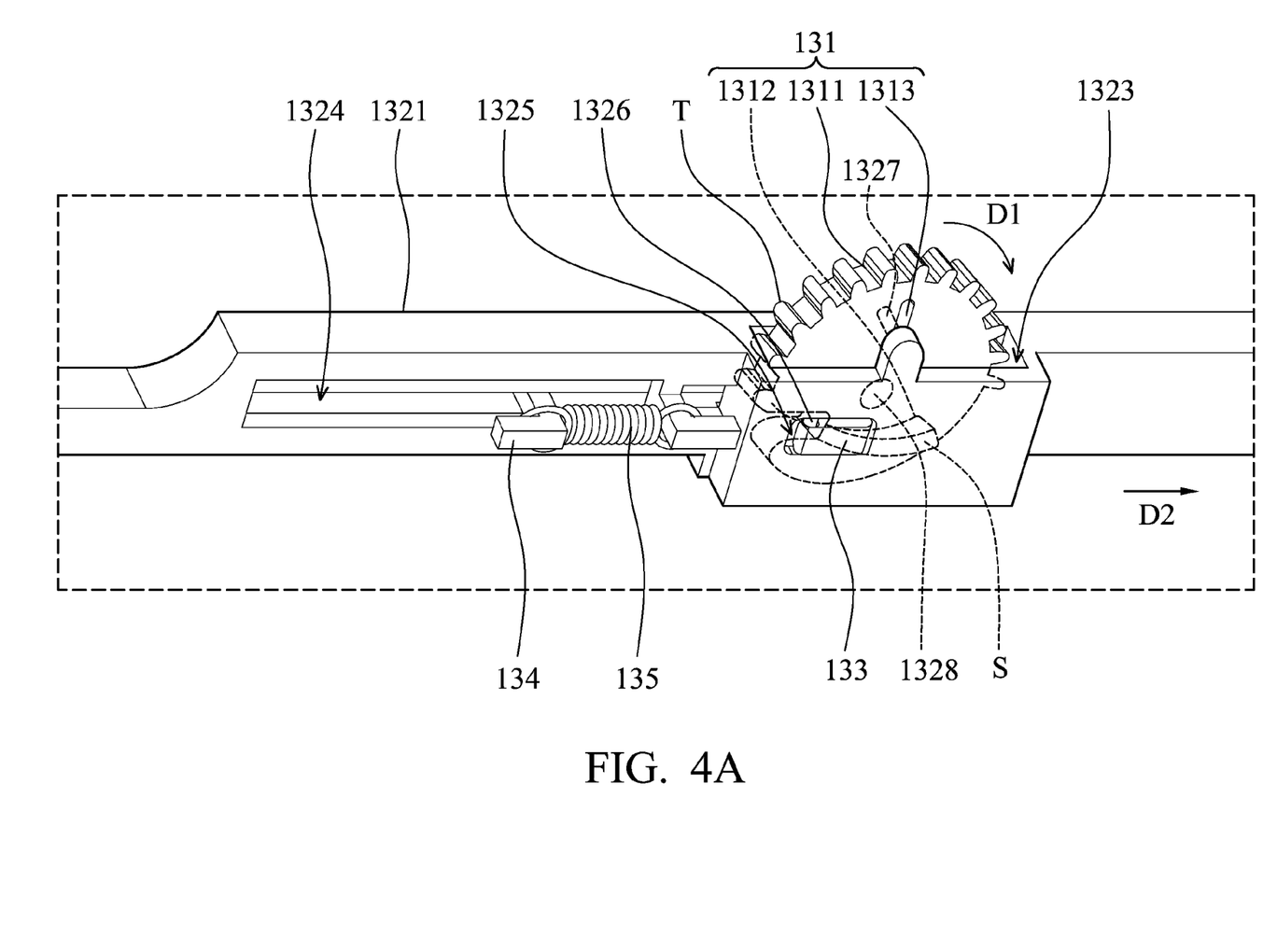
FIGS. 4A and 4B are schematic views showing the operation of the engaging mechanism of the invention.
Figure 4B:
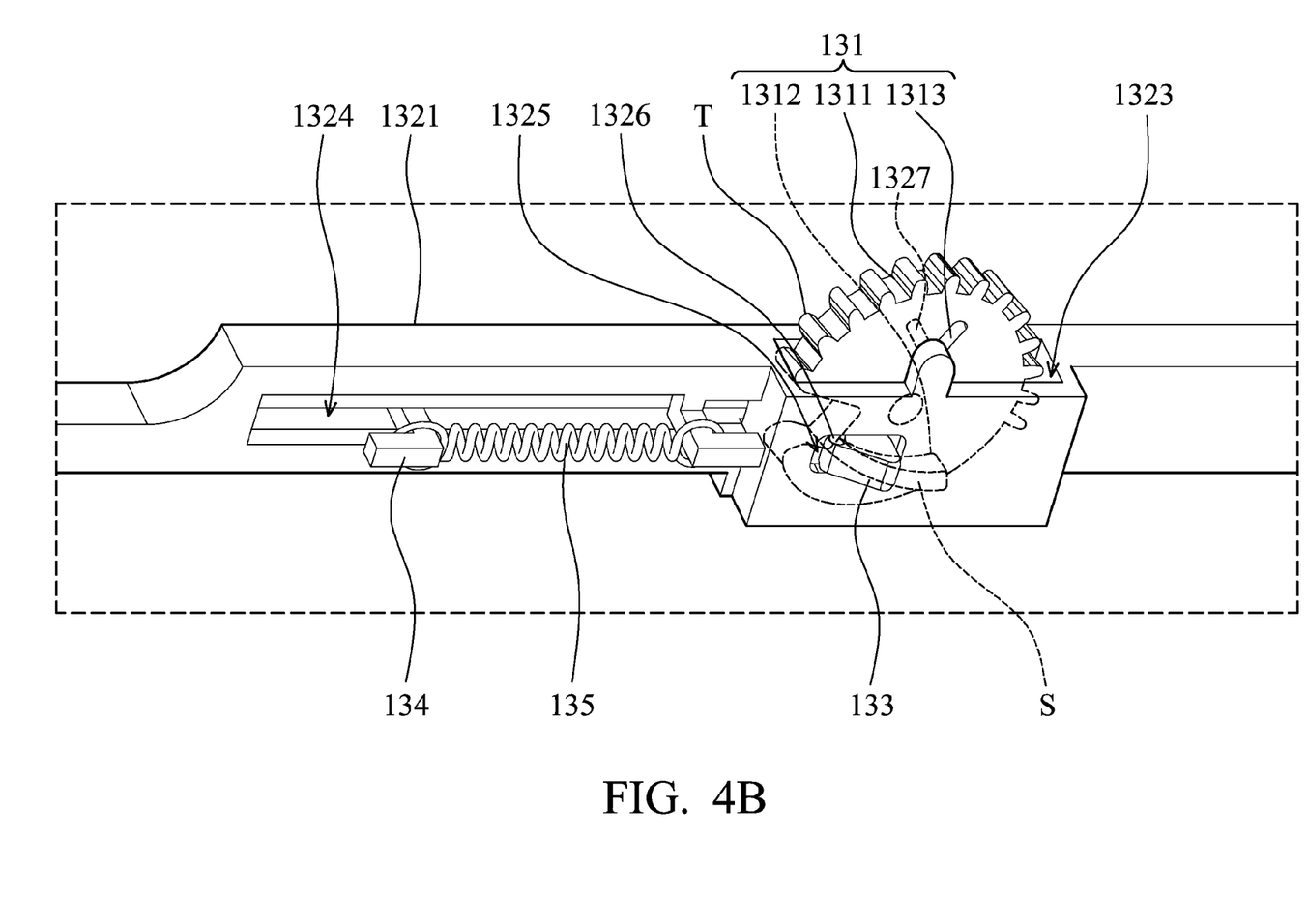

Referring to FIGS. 2, 3A, 3B, 4A and 4B simultaneously, as shown in FIG. 2, the moving member 132, disposed in the second body 120, comprises a moving body 1321, two hooks 1322, a receiving portion 1323 (as shown in FIGS. 4A, 4B), a track 1324, a through hole 1325 and an axle 1326.

As shown in FIG. 3A, the moving body 1321 is movably disposed on the second body 120. Two hooks 1322 are disposed on two opposite ends E1, E2 of the moving body 1321, respectively, and exposed outside of the second body 120 through the two apertures H corresponding thereto to engage with the first body 110. The receiving portion 1323 is formed in the moving body 1321 (as shown in FIGS. 4A, 4B) for receiving the rotating member 131. The track 1324 is formed on the moving body 1321. The through hole 1325 is also formed on the moving body 1321. The axle 1326 is disposed within the through hole 1325. The abutting member 133, disposed on the moving member 132, rotates around the axle 1326 to be in the through hole 1325 (as shown in FIG. 4A) or out of the through hole 1325 (as shown in FIG. 4B).

Referring to FIGS. 4A, 4B, the moving member 132 further comprises a rod 1327 disposed on the moving member 132 and adjacent to the receiving portion 1323. When the rotating member 131 is disposed in the receiving portion 1323, the rod 1327 is corresponded to the slot 1313 of the rotating member 131 and inserted into the slot 1313. Further, the slanted surface S of the protrusion 1312 abuts the abutting member 133. When the rotating body 1311 rotates, the protrusion 1312 are driven to push the abutting member to slide along the slanted surface S of the protrusion 1312, such that the abutting member 133 is able to rotate in or out of the through hole 1325. When the abutting member 133 rotates out of the through hole 1325, it penetrates the corresponding aperture H on the second body 120 and abuts the first body 110. Additionally, during the rotation of the rotating body 1311, the slot 1313 is driven to move the rod 1327 therein.

The fixing member 134 is fixed on the second body 120 and penetrates the track 1324 of the moving member 132. Two ends of the elastic member 135 connect to the moving member 132 and the fixing member 134, respectively. Thus, when the moving member 132 moves, the elastic member 135 is deformed (as shown in FIG. 4B) to store a potential energy (elastic force).

Figure 5A:
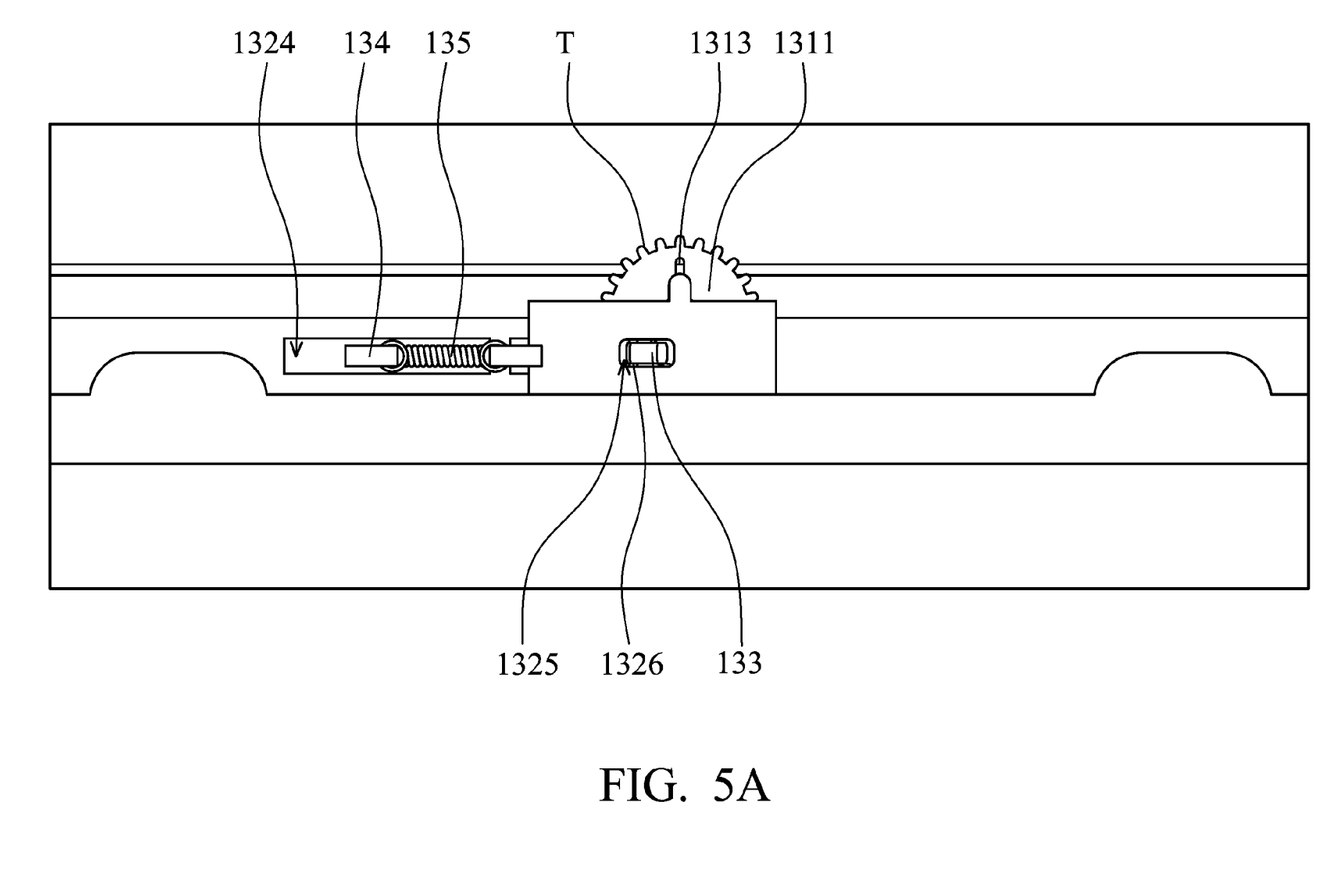
FIGS. 5A to 5C are schematic views showing the operation of the engaging mechanism of the invention.
Figure 5B:
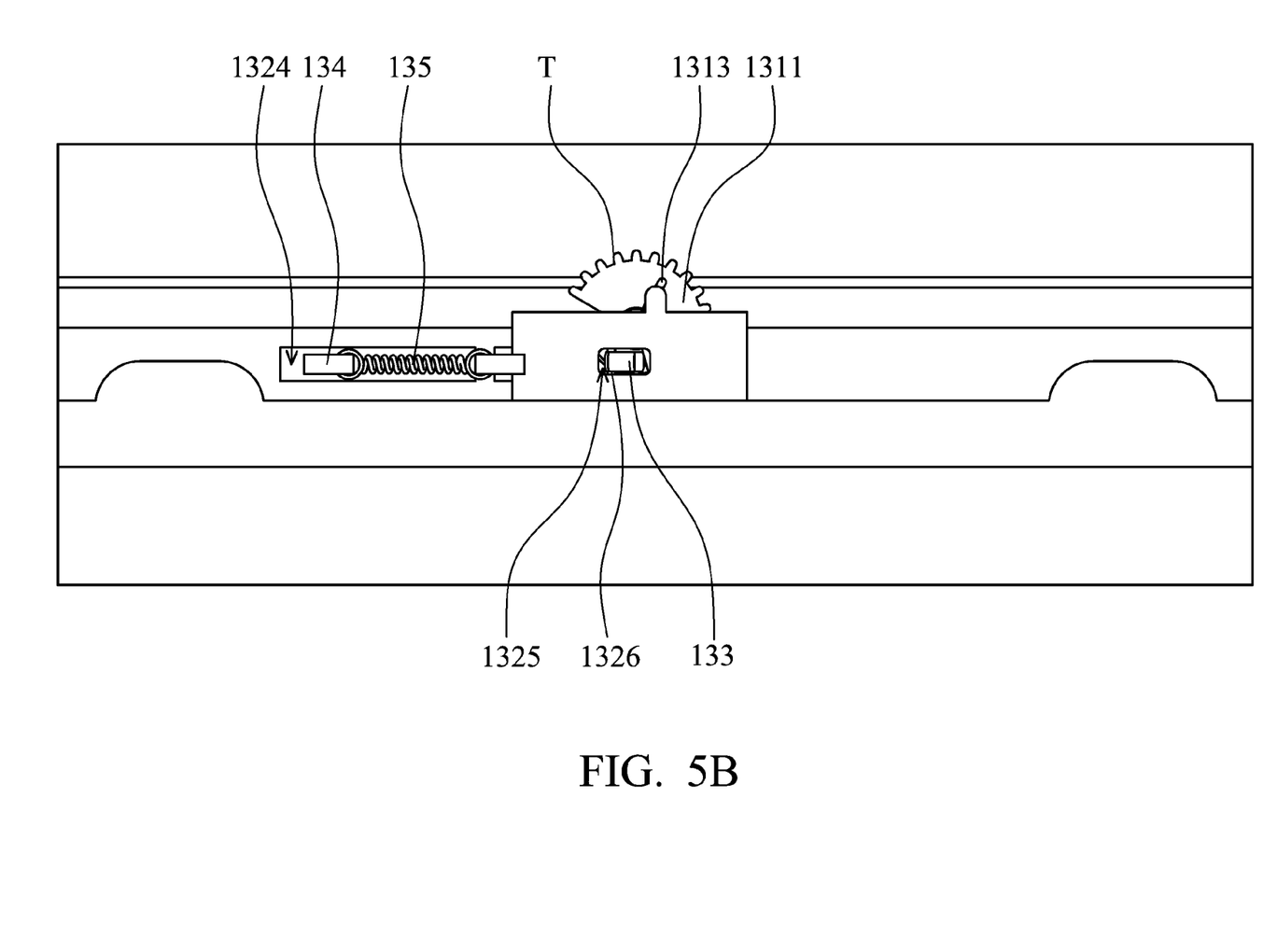
Figure 5C:
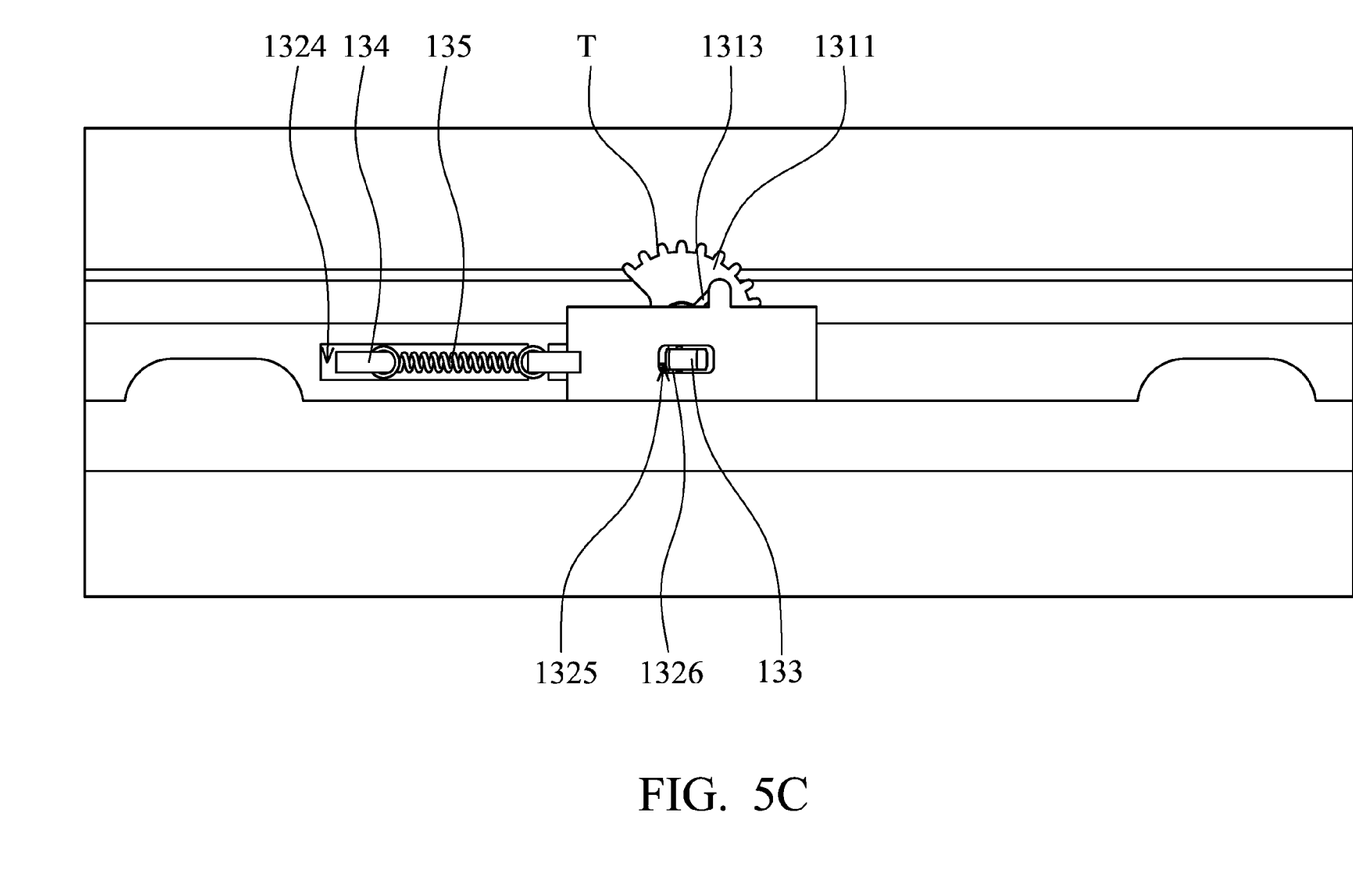

When the hooks 1322 engage with the first body 110, the relative position of all components of the engaging mechanism 130 is shown in FIG. 4A, and when the rotating member 131 is rotated, the relative position of all components of the engaging mechanism 130 is shown in FIG. 4B. Referring to FIG. 5A to 5C at the same time as FIGS. 4A, 4B, the user rotates the rotating member 131 along a first direction D1 to change the position of the slot 1314 on the rotating body 1311. Further, the rod 1327 disposed in the slot 1314 is moved accordingly, and the moving body 1321 connected to the rod 1327 is also moved along a second direction D2. Moreover, the hooks 1322 on two ends of the moving body 1321 is moved with the moving body 1321 to be separated from the first body 110.

Besides, when the rotating member 131 rotates along the first direction D1, in addition to the separation between the hooks 1322 and the first body 110, the protrusion 1312 on the rotating body 1311 is driven to push the abutting member 133 accordingly. The abutting member 133 is then pushed to rotate from the inside to the outside of the through hole 1325, thus abutting the first body 110 through the aperture H. As a result, the first body 110 is pushed away from the second body 120.

Moreover, when the moving member 132 is pushed by the rotating member 131 along the second direction D2, an elastic force is accumulated in the elastic member 135. When the user sets free the rotating member 131, the elastic force within the elastic member 135 is released to move the moving member 132 back to its original position. The rotating member 131 and the abutting member 133 are also moved to their original positions due to the connection with the moving member 132.

In the electronic device 100 of the invention, only the rotation of the rotating member 131 is required to move the moving member 132 and the abutting member 133 simultaneously. Therefore, the operation of opening the first body 110 from the second body 120 can be accomplished with one hand, which is convenient and simple for users to operate.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a first body;
   a second body connected to the first body and being rotatable relatively to the first body; and
   an engaging mechanism disposed on the second body, comprising:
   a rotating member rotatably disposed on the second body;
   a moving member movably disposed on the second body and abutting the rotating member;
   an abutting member rotatably disposed on the moving member and abutting the rotating member;
   wherein the second body is fastened to the first body by the moving member of the engaging mechanism, and when the rotating member rotates along a first direction, the moving member is pushed along a second direction to depart from the first body, and the abutting member pushes the first body away from the second body.

2. The electronic device as claimed in claim 1, wherein the moving member comprises a through hole and an axle, the axle is disposed in the through hole, and the abutting member rotates around the axle to be in the through hole or out of the through hole, and when the rotating member rotates along the first direction, the abutting member is rotated out of the through hole.

3. The electronic device as claimed in claim 2, wherein the rotating member comprises a rotating body and a protrusion, the protrusion is fixed on the rotating body and abuts the abutting member, and when the rotating body rotates along the first direction, the protrusion pushes the abutting member to rotate out of the through hole.

4. The electronic device as claimed in claim 3, wherein the protrusion has a slanted surface abutting the abutting member, and when the rotating member rotates along the first direction, the abutting member slides along the slanted surface.

5. The electronic device as claimed in claim 4, wherein the moving member comprises a moving body and a rod, and the rotating member comprises a slot, wherein the rod is fixed on the moving body and inserted in the slot, and when the rotating member rotates along the first direction, the slot is driven to move the rod along the second direction.

6. The electronic device as claimed in claim 5, wherein the engaging mechanism further comprise a fixing member and an elastic member, the fixing member is fixed on the second body, the elastic member comprises two ends to connect the fixing member and the moving member, respectively, and when the moving member moves along the second direction, a potential energy is stored in the elastic member.

7. The electronic device as claimed in claim 6, wherein the moving member comprises a track, and the fixing member is disposed through the track.

8. The electronic device as claimed in claim 7, wherein the rotating member has a toothed surface.

9. An electronic device, comprising:
a first body;
a second body connected to the first body and being rotatable relatively to the first body; and
an engaging mechanism disposed on the second body, comprising:
a rotating member rotatably disposed on the second body; and
a moving member movably disposed on the second body and abutting the rotating member,
wherein the second body is fastened to the first body by the moving member of the engaging mechanism, and when the rotating member rotates along a first direction, the moving member is pushed along a second direction to depart from the first body, wherein the engaging mechanism further comprises an abutting member rotatably disposed on the moving member and abutting the rotating member;
wherein the moving member comprises a through hole and an axle, the axle is disposed in the through hole, and the abutting member rotates around the axle to be in the through hole or out of the through hole, and when the rotating member rotates along the first direction, the abutting member is rotated out of the through hole.

10. The electronic device as claimed in claim 9, wherein the rotating member comprises a rotating body and a protrusion, and the protrusion is fixed on the rotating body and abuts the abutting member, and when the rotating body rotates along the first direction, the protrusion pushes the abutting member to rotate out of the through hole.

11. The electronic device as claimed in claim 10, wherein the protrusion has a slanted surface abutting the abutting member, and when the rotating member rotates along the first direction, the abutting member slides along the slanted surface.

12. The electronic device as claimed in claim 1, wherein the moving member comprises a moving body and two hooks disposed on two opposite ends of the moving body, respectively.

13. The electronic device as claimed in claim 12, wherein the first body has two openings, the two hooks penetrate the two openings and engages with the first body, respectively, and when the moving member moves along the second direction, the two hooks are separated from the first body.

14. The electronic device as claimed in claim 1, wherein the moving member comprises a moving body and a rod, and the rotating member comprises a slot, wherein the rod is fixed on the moving body and inserted in the slot, and when the rotating member rotates along the first direction, the slot is driven to move the rod along the second direction.

15. The electronic device as claimed in claim 1, wherein the engaging mechanism further comprises a fixing member and an elastic member, the fixing member is fixed on the second body, and the elastic member comprises two ends to connect the fixing member and the moving member, respectively, and when the moving member moves along the second direction, a potential energy is stored in the elastic member.

16. The electronic device as claimed in claim 15, wherein the moving member comprises a track, and the fixing member is disposed through the track.

17. The electronic device as claimed in claim 1, wherein the rotating member has a toothed surface.

18. The electronic device as claimed in claim 1, wherein the first body has an opening, and the moving member penetrates the opening and engages with the first body.

* * * * *